(12) United States Patent
Lin et al.

(10) Patent No.: US 8,994,697 B2
(45) Date of Patent: Mar. 31, 2015

(54) METHOD FOR DETERMINING TOUCH POINT DISPLACEMENT AND ASSOCIATED APPARATUS

(75) Inventors: Tsung-Fu Lin, Hsinchu Hsien (TW); Chao-Cheng Wen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1244 days.

(21) Appl. No.: 12/844,049

(22) Filed: Jul. 27, 2010

(65) Prior Publication Data
US 2011/0025628 A1 Feb. 3, 2011

(30) Foreign Application Priority Data
Jul. 31, 2009 (TW) .............................. 98125778 A

(51) Int. Cl.
*G06F 3/041* (2006.01)
*G06F 3/045* (2006.01)
*G06F 3/0488* (2013.01)

(52) U.S. Cl.
CPC .......... *G06F 3/0418* (2013.01); *G06F 3/04883* (2013.01)
USPC .......................... 345/178; 345/173; 178/18.02

(58) Field of Classification Search
CPC ..... G06F 3/017; G06F 3/0418; G06F 3/0488; G06F 3/04883; G06F 2203/04104; B60K 2350/1028
USPC ...................... 345/173–179; 178/18.01–20.04
See application file for complete search history.

(56) References Cited

U.S. PATENT DOCUMENTS

| 5,543,591 | A | 8/1996 | Gillespie et al. | |
|---|---|---|---|---|
| 5,825,352 | A | 10/1998 | Bisset et al. | |
| 5,880,411 | A | 3/1999 | Gillespie et al. | |
| 5,943,052 | A | 8/1999 | Allen et al. | |
| 6,366,866 | B1 * | 4/2002 | Kanagawa et al. | 702/95 |
| 6,380,931 | B1 | 4/2002 | Gillespie et al. | |
| 7,274,353 | B2 | 9/2007 | Chiu et al. | |
| 2004/0196269 | A1 * | 10/2004 | Dotson | 345/173 |
| 2005/0162404 | A1 | 7/2005 | Chiu et al. | |
| 2005/0179672 | A1 | 8/2005 | Chiu et al. | |
| 2005/0259086 | A1 | 11/2005 | Chiu et al. | |
| 2006/0022956 | A1 | 2/2006 | Lengeling et al. | |
| 2006/0026521 | A1 | 2/2006 | Hotelling et al. | |
| 2006/0026535 | A1 | 2/2006 | Hotelling et al. | |
| 2006/0026536 | A1 | 2/2006 | Hotelling et al. | |
| 2006/0033722 | A1 | 2/2006 | Chiu et al. | |
| 2006/0038796 | A1 * | 2/2006 | Hinckley et al. | 345/173 |
| 2006/0066590 | A1 * | 3/2006 | Ozawa et al. | 345/173 |
| 2006/0125801 | A1 | 6/2006 | Hsu et al. | |
| 2006/0232559 | A1 | 10/2006 | Chien et al. | |

(Continued)

FOREIGN PATENT DOCUMENTS

CN 101295220 A 10/2008
CN 101398739 A 4/2009

*Primary Examiner* — Temesgh Ghebretinsae
*Assistant Examiner* — Keith Crawley
(74) *Attorney, Agent, or Firm* — Edell, Shapiro & Finnan, LLC

(57) ABSTRACT

A method for determining a displacement of a touch point is applied to a touch panel to reduce noise interfering with determination of the displacement. The method includes obtaining a displacement according to a movement of a touch point on the touch panel; checking whether the displacement is within a predetermined range; and determining that the movement is valid when the displacement is within the predetermined range.

14 Claims, 5 Drawing Sheets

(56) References Cited

U.S. PATENT DOCUMENTS

| | | |
|---|---|---|
| 2006/0232563 A1 | 10/2006 | Lii et al. |
| 2006/0279550 A1 | 12/2006 | Lii et al. |
| 2006/0279551 A1 | 12/2006 | Lii et al. |
| 2007/0008295 A1 | 1/2007 | Chien et al. |
| 2007/0013669 A1 | 1/2007 | Chien et al. |
| 2007/0013670 A1 | 1/2007 | Chien et al. |
| 2007/0046648 A1 | 3/2007 | Lee et al. |
| 2007/0070044 A1 | 3/2007 | Yeh et al. |
| 2007/0070049 A1 | 3/2007 | Lee et al. |
| 2007/0075983 A1 | 4/2007 | Chiu et al. |
| 2007/0075984 A1 | 4/2007 | Chiu et al. |
| 2007/0080953 A1 | 4/2007 | Lii |
| 2007/0091075 A1 | 4/2007 | Lii |
| 2007/0091077 A1 | 4/2007 | Lii et al. |
| 2007/0126708 A1 | 6/2007 | Yang et al. |
| 2007/0132741 A1 | 6/2007 | Chiu et al. |
| 2007/0165005 A1 | 7/2007 | Lii et al. |
| 2007/0185631 A1 | 8/2007 | Yeh et al. |
| 2008/0106524 A1 | 5/2008 | Chiu et al. |
| 2008/0150715 A1 | 6/2008 | Tang et al. |
| 2009/0217211 A1* | 8/2009 | Hildreth et al. ............... 715/863 |
| 2010/0020029 A1* | 1/2010 | Park et al. .................... 345/173 |
| 2012/0044150 A1* | 2/2012 | Karpin et al. ................. 345/173 |

\* cited by examiner

METHOD FOR DETERMINING TOUCH POINT DISPLACEMENT AND ASSOCIATED APPARATUS

CROSS REFERENCE TO RELATED PATENT APPLICATION

This patent application is based on Taiwan, R.O.C. patent application No. 098125778 filed on Jul. 31, 2009.

FIELD OF THE INVENTION

The present invention relates to a method for determining a displacement of a touch point and an associated apparatus, and more particularly, to a method for determining a displacement of a touch point and an associated apparatus capable of determining whether the displacement corresponds to a valid touch point movement according to an upper limit and a lower limit of a valid interval via two predetermined values.

BACKGROUND OF THE INVENTION

A touch panel, an input apparatus that allows a finger to move on a smooth panel to control a cursor, is frequently used with laptop computers, mobile phones, personal digital assistants (PDAs) and other electronic apparatus. Since a principle of the touch panel does not involve a mechanistic design that is applied to a mouse or a keyboard, it is rather simple to maintain the touch panel. As current electronic products are being developed to be more compact with better portability, the touch panel serving as an input apparatus is also becoming more popular.

For a touch panel, an electric signal is generated from sensing pressure on the touch panel touched by a finger or a conductivity change caused by a finger touch. Thus, a touch point sensed on the touch panel and a displacement of the touch point are influenced by a touch strength, a touched area, a hand tremor or a sensitivity of the touch panel. In addition, since a surge caused by electromagnetic interferences (EMI) may trigger the touch panel to detect an incorrect touch point, a misjudgment on the displacement of the touch point may also be concluded by the touch panel. For example, a part of certain sensors of the touch panel may be mistakenly determined as being touched since a voltage of those sensors is increased due to mobile phone electromagnetic waves, thus leading to a misjudgment concluded by the touch panel.

Therefore, a method for determining a touch point movement and an associated apparatus capable of reducing noise that interferes with determination of a displacement of a touch point are keys for increasing efficiency of applications of a touch panel.

SUMMARY OF THE INVENTION

With respect to the foregoing issues, one object of the present invention is to provide a novel method for determining a displacement of a touch point and an associated apparatus. According to the present invention, two predetermined values are defined to limit a touch point displacement of a touch point when a touch panel is under normal operations, and it is determined whether the detected touch point movement is valid or is a misjudgment according to the predetermined values.

In order to achieve the foregoing objects, according to an embodiment of the present invention, a method for determining a displacement of a touch point, applied to a touch panel, comprises obtaining the displacement according to a movement of the touch point on the touch panel; checking whether the displacement is within a predetermined range; and determining that the movement is valid when the displacement is within the predetermined range.

According to another embodiment of the present invention, an apparatus for determining a displacement of a touch point comprises a detecting module, for detecting the displacement of a movement of the touch point on a touch panel; a checking module, for checking whether the displacement is within a predetermined range; and a determining module, for determining that the movement is valid when the check result indicates that the displacement is within the predetermined range.

Through comparisons of the detected displacement of the touch point with the first and second predetermined values, it is determined whether the displacement of the touch point is within a valid movement interval. When the displacement of the touch point is not within the valid movement interval, it is determined that the displacement of the touch point movement is a misjudgment caused by noise interference and is thus discarded; when the displacement of the touch point is within the valid movement interval, it is determined that the touch point movement is valid. Accordingly, noise that interferes with determination of a displacement of a touch point is reduced to significantly increase an accuracy of information of the displacement of the touch point.

DETAILED DESCRIPTION OF THE PREFERRED EMBODIMENT

In common applications of a touch panel, it is first determined whether a touch is recognized as a touch point. Since the touch panel continuously scans sensors of the touch panel to detect which sensor is being touched (e.g., when a voltage of the sensor sensing the touch increases). With a scan frequency of the touch panel being tens of times per second, under normal operating conditions, the touch sensed by the sensor at the touched position is detected by several consecutive scans within a period during which the touch panel is pressed. More specifically, the touch is determined as a touch point only when the sensor corresponding to the touch point senses the touch for a predetermined period during scanning or by a predetermined number of times of scans. On the contrary, when the sensor on the touch panel only senses the touch in certain scans with the touched time not exceeding the predetermined period, the touch panel does not regard the position sensed by the sensor as a touch point.

Figure 1:
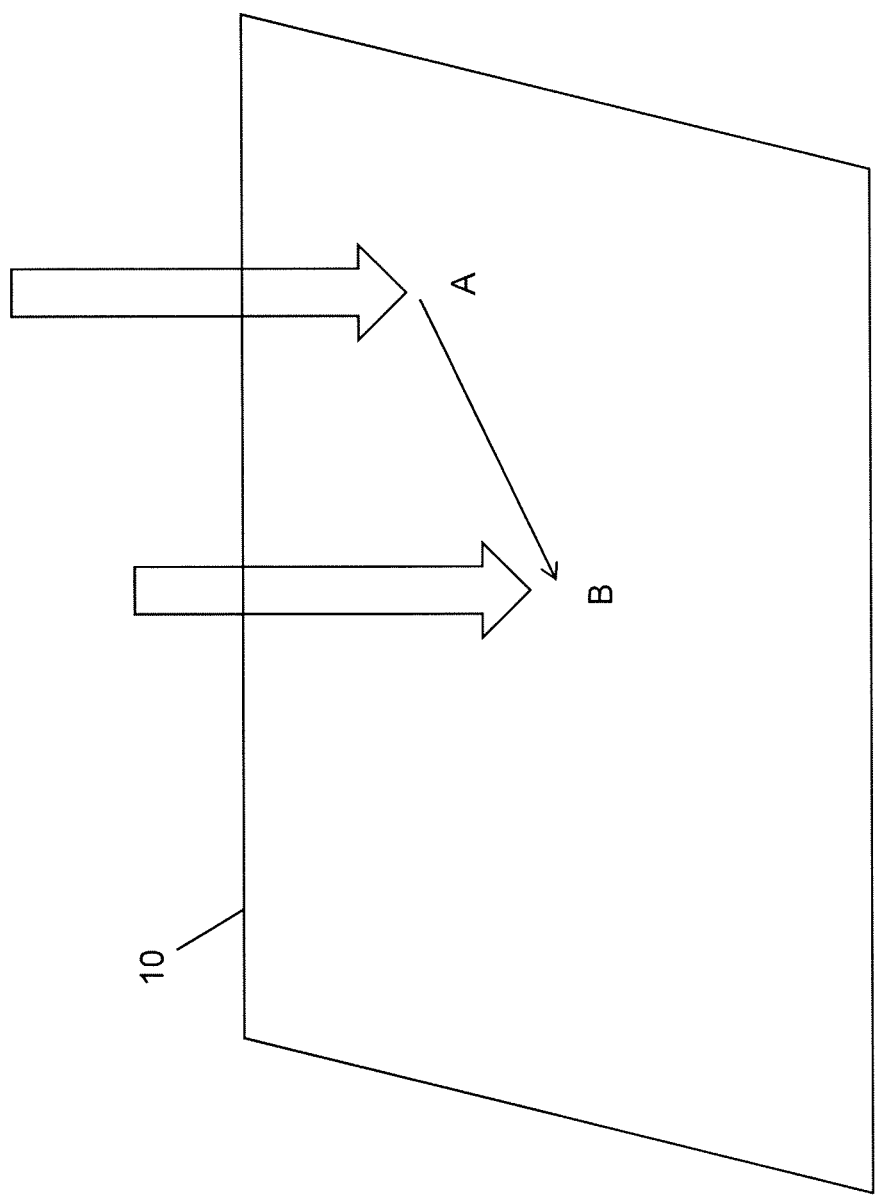
FIG. 1 is a schematic diagram of a practical application of a touch panel.

FIG. 1 shows a schematic diagram of a practical application of a touch panel 10. When a user touches a point A on the touch panel 10 with his finger or a touch pen, the touch panel 10 detects a corresponding touch point according to an electric signal change corresponding to the touch. When the user moves his finger or the touch pen to a point B on the touch panel 10, a movement path AB corresponding to the touch points A and B is generated. According to a direction and a distance of the path AB, a corresponding electric signal generated by the touch panel 10 is transmitted to a system that performs an operation corresponding to the movement of the finger of the user or the touch pen, e.g., the operation is to move a cursor on a screen.

Errors may occur in the determination of a touch point movement due to a touch strength, a hand tremor, a sensitivity of the touch panel 10 or circuit surges caused by EMI. Under normal operations of the touch panel 10, within a time period, a touch point movement between two touch points is limited by a physical limitation of a motion of a human finger. Therefore, a displacement valid interval is defined in a reasonable range to determine whether the touch point movement is valid when the touch panel 10 is under normal operations.

Figure 2:
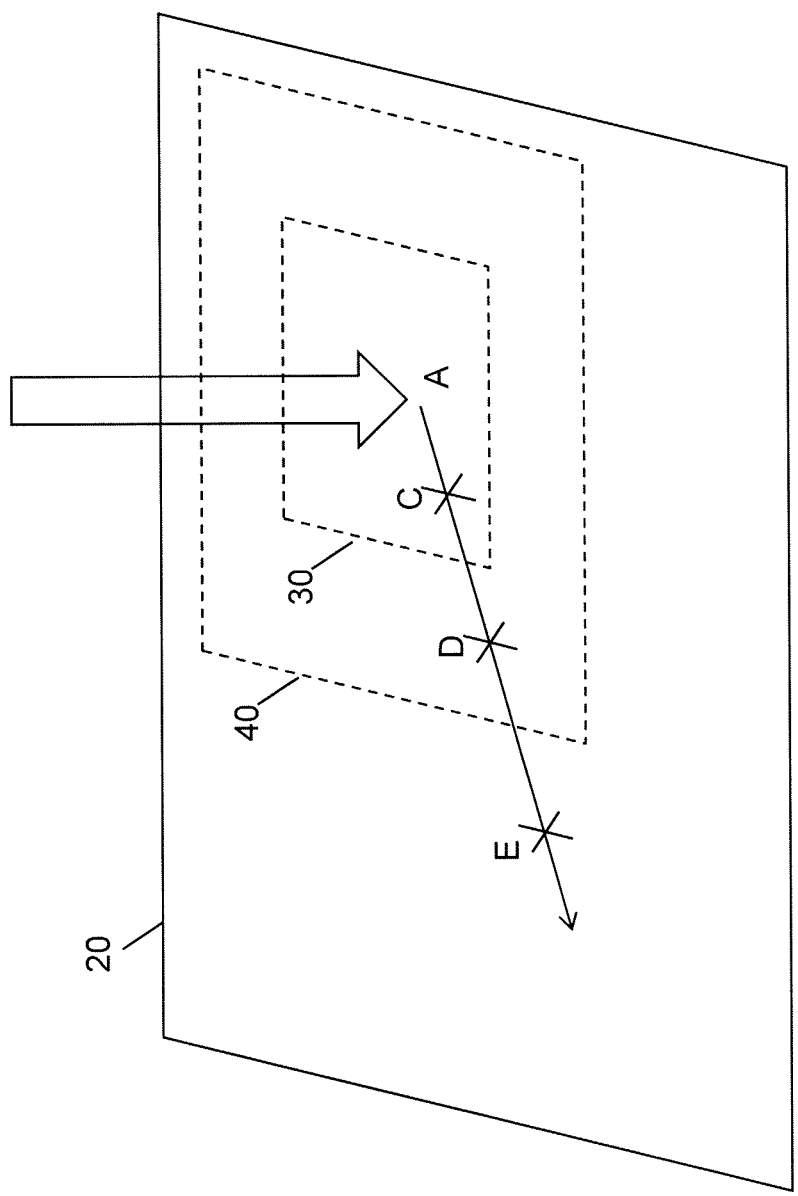
FIG. 2 is a schematic diagram of a touch panel implementing a method for determining a displacement of a touch point in accordance with an embodiment of the present invention.

FIG. 2 shows a schematic diagram of a touch panel implementing a method for determining a touch point displacement in accordance with an embodiment of the present invention. A touch point A is generated by a user touching a touch panel 20. Suppose then the user moves the touch point towards a direction of the arrow in FIG. 2 to generate a displacement corresponding to the movement of the touch point. For example, the touch point is moved to a position C, D or E shown in FIG. 2 to generate a displacement AC, AD or AE. At this point, two limit ranges are determined by a first predetermined value and a second predetermined value, e.g., a lower limit range 30 is determined according to the first predetermined value and an upper limit range 40 is determined according to the second predetermined value. A predetermined range from the lower limit range 30 to the upper limit range 40 is a valid interval. Basically, when the touch point displacement is within the predetermined range (i.e., the displacement is greater than the first predetermined value and is smaller than the second predetermined value, e.g., the displacement AD in FIG. 2), it is determined that the movement of a touch point is valid and the system is informed to perform an operation corresponding to the movement. On the contrary, when the touch point displacement is not within the predetermined range (i.e., the displacement is smaller than the first predetermined value or is greater than the second predetermined value, e.g., the displacement AC or AE in FIG. 2), the displacement of the touch point is discarded and the system does not perform any operation. The first predetermined value and the second predetermined value, as keys for determining the predetermined range, are determined according to possible valid movements generated by using the touch panel under normal operations, and are varied according to factors such as a size or sensitivity of the touch panel. In addition, the first predetermined value and the second predetermined value may be defined by a designer before leaving the factory, user-defined, or defined according to usage habits of the user by implementing an auto-learning mechanism designed by software.

Generally speaking, the situation that the displacement of a touch point is smaller than the first predetermined value (e.g., the displacement AC in FIG. 2) is caused by manual operations such as a hand tremor; the situation that the touch point movement is greater than the second predetermined value (e.g. the displacement AE in FIG. 2) is generated due to a system misjudge caused by EMI. Accordingly, the method for determining a displacement of a touch point and an associated apparatus according to the present invention are especially effective in preventing system misjudges caused by EMI.

When a touch panel is designed, considering circumstances that different types of products apply touch panels of different specifications, it is extremely inefficient to respectively define a first predetermined value and a second predetermined value for the touch panels applied in the different types of products. Therefore, through a mathematical calculation, e.g., a normalizing calculation, the first predetermined value and the second predetermined value are standardized to be applied to touch panels of all types of specifications. At this point, the displacement is accordingly adjusted to be compared with the first predetermined value and the second predetermined value to determine whether the movement is valid. For example, suppose a diagonal distance of the touch panel is specified as 1 and the first and second predetermined values are specified as numbers between 0 to 1. Thus, the first predetermined value, the second predetermined value and the displacement are restored with respect to an actual diagonal distance of the touch panel when such specification is applied to touch panels of different sizes. The diagonal distance of the touch panel used in the normalizing calculation is discussed for illustration purposes, and a length or a width of the touch panel may also be applied to the normalizing calculation. In addition, the normalizing calculation is not the only calculation approach, but other calculation approaches may also be adopted according to actual requirements. Further, the calculation approaches with respect to the first predetermined value and the second predetermined value need not be identical to that with respect to the displacement. The foregoing modifications are within the spirit and scope of the present invention, and principles of the modifications apparent to a person having ordinary skills in the art shall not be described for brevity.

Since the touch panel is actually a two-dimensional (2D) space, two coordinate axis directions of 2D coordinates are analyzed, e.g., the displacement of a touch point can be divided into two components in the two coordinate axis directions, and the two components are then analyzed, e.g., a first predetermined value and a second predetermined value are defined in a first coordinate axis direction. After that, the component of the displacement in the first coordinate axis direction is compared with the first predetermined value and the second predetermined value, and the component of the displacement in a second coordinate axis direction is compared with a third predetermined value and a fourth predetermined value, so as to generate two comparison results. According to the comparison results, it is determined whether the displacements correspond to valid touch point movements in the two coordinate axis directions. More specifically, when the component of the displacement is greater than the first predetermined value and is smaller than the second predetermined value, it is determined that the movement is valid in the first coordinate axis direction; and when the component of the displacement is greater than the third predetermined value and is smaller than the fourth predetermined value, it is determined that the movement is valid in the second coordinate axis direction. When the validity of the movement of the touch point is respectively determined in the two coordinate axis directions, supposing an actual movement is parallel to one of the two coordinate axis directions, e.g., the first coordinate axis direction, at this point, the movement is determined as valid in the first coordinate axis direction but the movement is determined as invalid in the second coordinate axis direction, and accordingly the movement should be valid. In addition, a time interval can be defined, with a touch point detected by the touch panel at a start point of the time interval being regarded as a first touch point, and a touch point detected by the touch panel at an end point of the time interval being regarded as a second touch point. A displacement is a distance from the first touch point to the second touch point.

Figure 3B:
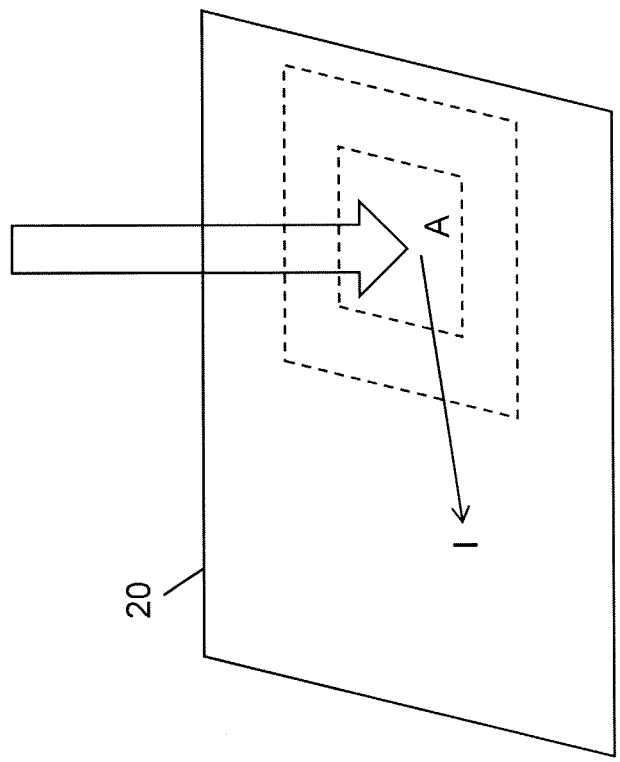
FIG. 3b is a schematic diagram of a plurality of reference displacements equivalent to an average displacement on a touch panel implementing a method for determining a displacement of a touch point according to the present invention.
Figure 3A:
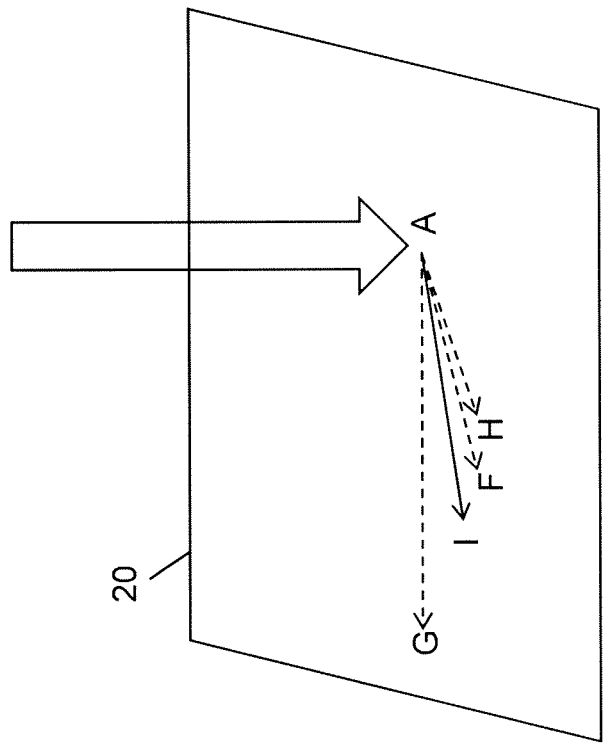
FIG. 3a is a schematic diagram of a method for determining a displacement of a touch point according to the present invention when a plurality of touch points are simultaneously detected on a touch panel.

When noise (e.g., EMI) occurs, interference may be present in numerous different areas at a same time on the touch panel to lead to abnormalities in electric signals on the touch panel, such that the system may misjudge that the numerous different areas of the touch panel are touched. The method for determining a displacement of a touch point according to the present invention is capable of solving the foregoing problem. Referring to FIG. 3a, a point A of the arrow represents a position of a touch point detected by a touch panel 20 at a start point of a time interval. When the time interval ends, touch signals are detected in different areas on the touch panel 20 supposing the touch panel 20 is interfered with by noise. According to points F, G and H in FIG. 3a, mathematical calculations are performed on three displacements AF, AG and AH to obtain a representative displacement. Since the three displacements AF, AG and AH have point A as a start point, the mathematic calculations are directly performed on points F, G and H to obtain a representative point I, which is adopted in junction with the start point to form the representative displacement AI. In this embodiment, the three displacements AF, AG and AH are averaged to obtain the average displacement AI. The mathematical calculations are not limited to the averaging calculation, but other calculation approaches may also be used to calculate the representative displacement. For example, a weight of a certain displacement is increased or reduced according to user requirements, or certain abnormal displacements are discarded and remaining displacements are averaged to generate the average displacement AI. After that, according to the foregoing method, the average displacement AI is compared with a first predetermined value and a second predetermined value to determine whether the average displacement AI is valid, as shown in FIG. 3b.

Figure 4:
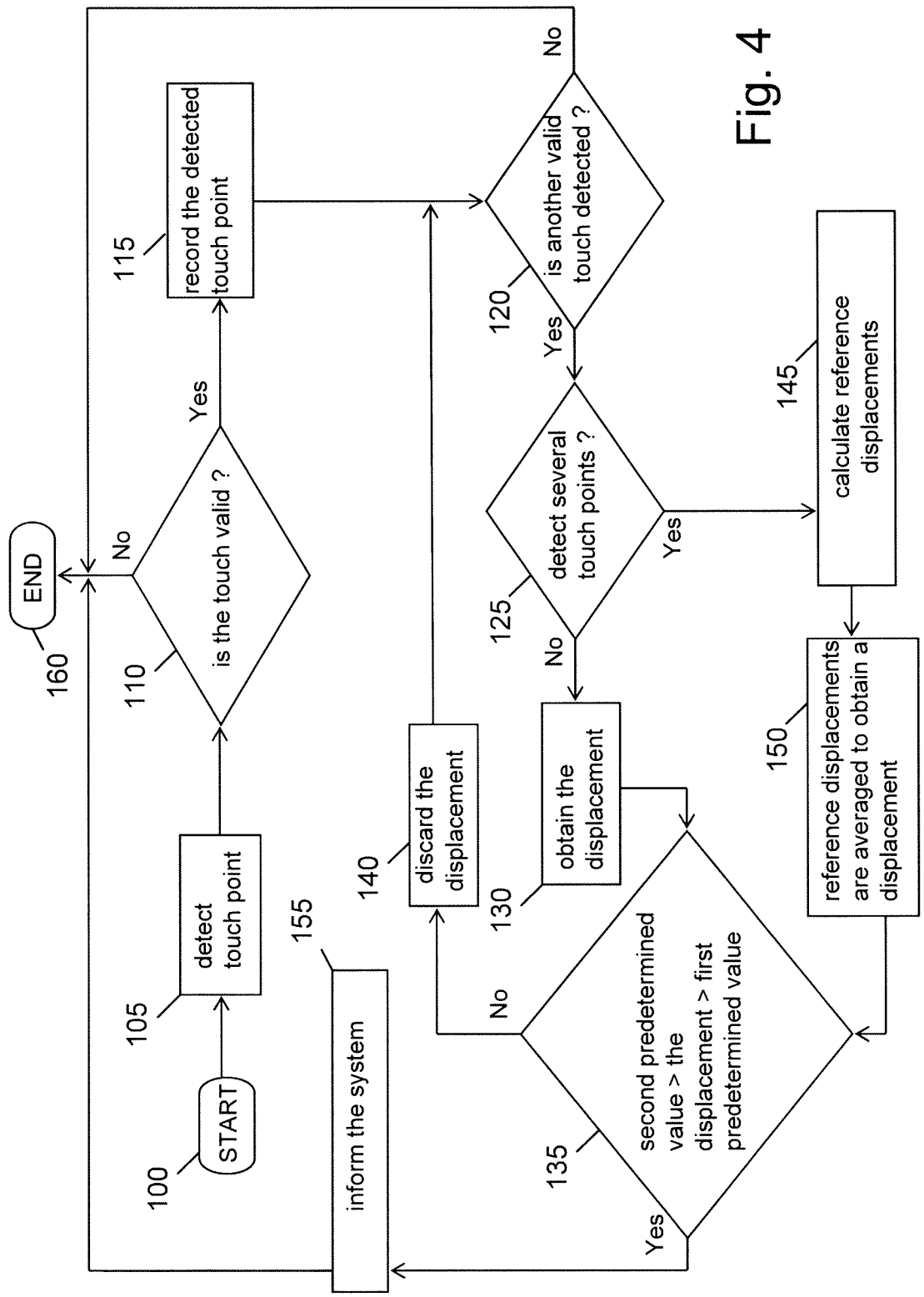
FIG. 4 is a flow chart of a method for determining a displacement of a touch point in accordance with an embodiment of the present invention.

FIG. 4 shows a flow chart of a method for determining a displacement of a touch point in accordance with an embodiment of the present invention. For illustration purposes, touch points are considered as being already formed, i.e., the step of determining whether a touch is valid is omitted. The method is described below.

The flow begins with Step 100. In Step 105, a touch point on the touch panel is detected. In Step 110, it is determined whether the touch is valid. When the answer of Step 110 is positive, Step 115 is performed; otherwise, Step 160 is performed. In Step 115, a position of the touch detected on the touch panel is recorded as a start touch point. In Step 120, it is determined whether another valid touch is detected on the touch panel. When the answer of Step 120 is positive, Step 125 is performed; otherwise, Step 160 is performed. In Step 125, it is determined whether a plurality of touch points are simultaneously detected on the touch panel. When the answer of Step 125 is positive, Step 145 is performed; otherwise, Step 130 in which a displacement is obtained by calculating a displacement between two touch points is performed. In Step 135, the displacement is compared with a first predetermined value and a second predetermined value. When the displacement is greater than the first predetermined value and is smaller than the second predetermined value, Step 155 is performed; when the displacement is smaller than the first predetermined value and is greater than the second predetermined value, Step 140 is performed. In Step 140, it is determined that the movement is invalid, and the displacement is discarded and the flow returns to Step 120. In Step 145, a plurality of reference displacements between the start touch point and the plurality of touch points are calculated, and the flow continues to Step 150. In Step 150, the plurality of reference displacements are averaged to obtain a displacement, and the flow returns to Step 135. In Step 155, the movement is valid, and the system is informed to perform an operation corresponding to the movement. In Step 160, the flow ends.

Figure 5:
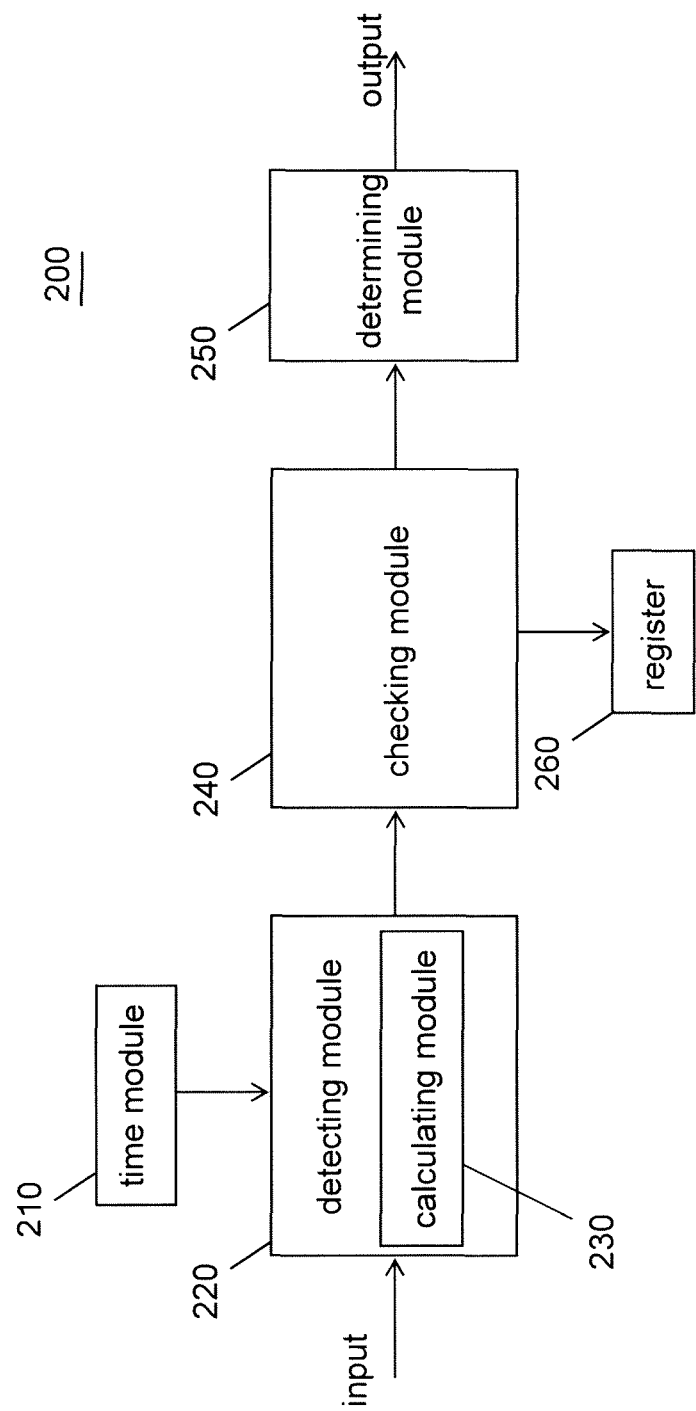
FIG. 5 is a block chart of an apparatus for determining a displacement of a touch point in accordance with an embodiment of the present invention.

According to another embodiment of the present invention, an apparatus for determining a touch point displacement is capable of reducing noises that interferer with the determination of the touch point displacement. FIG. 5 shows a block diagram of an apparatus for determining a displacement of a touch point in accordance with an embodiment of the present invention. An apparatus 200 for determining a displacement of a touch point comprises a time module 210, a detecting module 220, a checking module 240, a determining module 250, and a register 260. The detecting module 220 comprises a calculating module 230. For illustration purposes, touch points are considered as being already formed, i.e., the step of determining whether a touch is valid is omitted. A sensor of the touch panel first senses a touch point being generated and an area of the touch point, and transmits the sensed result to the detecting module 220. The time module 210 generates a time signal, e.g., a clock signal, and the detecting module 220 determines a time interval according to the time signal. At a start point of the time interval, the detecting module 220 detects a start position of a touch point on the touch panel, and detects an end position of the touch point on the touch panel at the end point of the time interval to generate a displacement. When positions of a plurality of touch points are detected on the touch panel at the end point of the time interval, the calculating module 230 of the detecting module 220 performs a mathematic calculation on the plurality of positions, e.g., an average calculation, to obtain the displacement. In another embodiment, the calculating module 230 of the detecting module 220 can perform another mathematic calculation, e.g., a normalizing calculation, to obtain a displacement. After that, the checking module 240 compares the displacement with a first predetermined value and a second predetermined value stored in the register 260 to check whether the displacement is within a predetermined range, so as to generate a check result to be transmitted to the determining module 250. When the check result indicates that the displacement is greater than the first predetermined value and is smaller than the second predetermined value, the determining module 250 determines that the movement is valid and transmits a signal to the system; when the check result indicates that the displacement is smaller than the first predetermined value or is greater than the second predetermined value, the determining module 250 determines that the movement is not valid and discards the displacement. It is to be noted that, in common electronic products, the apparatus for determining a touch point displacement according to the present invention may be realized by a hardware structure, e.g., physical electronic circuits. Alternatively, functions of the modules may be realized by software or firmware approaches, and other approaches apparent to a person having ordinary skills in the art shall not be described for brevity.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for determining a displacement of a touch point, applied to a touch panel, comprising:
   obtaining the displacement according to a movement of the touch point on the touch panel;
   checking whether the displacement is within a predetermined range; and
   determining that the movement is valid when the displacement is within the predetermined range,
   wherein the movement of the touch point is detected within a time interval, and
   wherein the step of obtaining the displacement according to the movement of the touch point on the touch panel comprises:
   generating a plurality of reference displacements according to a start position of the touch point at a start point of the time interval and a plurality of end positions of the touch point at an end point of the time interval;
   performing a second calculation on the plurality of reference displacements to obtain the displacement, wherein the second calculation is an average calculation; and
   discarding selected abnormal reference displacements among the plurality of reference displacements prior to performing the second calculation.

2. The method as claimed in claim 1, further comprising:
   discarding the displacement when the displacement is not within the predetermined range.

3. The method as claimed in claim 1, wherein the step of obtaining the displacement according to the movement of the touch point on the touch panel comprises:
   performing a first calculation on the movement of the touch point to obtain the displacement.

4. The method as claimed in claim 3, wherein the first calculation is a normalizing calculation.

5. The method as claimed in claim 1, wherein the predetermined range is determined by a first predetermined value and a second predetermined value, wherein the first predetermined value and the second predetermined value are defined according to usage habits of a user using an auto-learning mechanism, and the step of checking whether the displacement is within the predetermined range comprises:
   comparing the displacement with the first predetermined value and the second predetermined value to check whether the displacement is within a predetermined range.

6. The method as claimed in claim 5, wherein the displacement is determined as being within the predetermined range when the displacement is greater than the first predetermined value and is smaller than the second predetermined value.

7. The method as claimed in claim 1, wherein the displacement is a component of the movement of the touch point in one direction.

8. An apparatus for determining a displacement of a touch point, comprising:
   a detecting module, for detecting the displacement according to a movement of the touch point on a touch panel;
   a checking module, for checking whether the displacement is within a predetermined range;
   a determining module, for determining that the movement is valid when the check result indicates that the displacement is within the predetermined range, and
   a time module, for generating a time signal;
   wherein the detecting module determines a time interval according to the time signal, and detects the movement of the touch point within the time interval to generate the displacement, and
   wherein the detecting module comprises a calculating module, for generating a plurality of reference displacements according to a start position of the touch point at a start point of the time interval and a plurality of end positions of the touch point at an end point of the time interval, for performing a second calculation on the plurality of reference displacements to generate the displacement, wherein the second calculation is an average calculation, and for discarding selected abnormal reference displacements among the plurality of reference displacements prior to performing the second calculation.

9. The apparatus as claimed in claim 8, wherein the determining module discards the displacement when the check result indicates that the displacement is not within the predetermined range.

10. The apparatus as claimed in claim 8, wherein the detecting module comprises a calculating module for performing a first calculation to generate the displacement.

11. The apparatus as claimed in claim 10, wherein the first calculation is a normalizing calculation.

12. The apparatus as claimed in claim 8, wherein the predetermined range is determined by a first predetermined value and a second predetermined value, wherein the first predetermined value and the second predetermined value are defined according to usage habits of a user using an auto-learning mechanism, and the checking module compares the displacement with the first predetermined value and the second predetermined value to check whether the displacement is within a predetermined range.

13. The apparatus as claimed in claim 12, wherein the checking module determines the displacement as being within the predetermined range when the displacement is greater than the first predetermined value and is smaller than the second predetermined value.

14. The apparatus as claimed in claim 8, wherein the displacement is a component of the movement of the touch point in one direction.

* * * * *